United States Patent [19]

Ring

[11] Patent Number: 4,750,358
[45] Date of Patent: Jun. 14, 1988

[54] FLOW RATE DETERMINATION

[75] Inventor: Michael J. Ring, Mosman, Australia

[73] Assignee: CSR Limited, New South Wales, Australia

[21] Appl. No.: 940,862

[22] Filed: Dec. 12, 1986

[30] Foreign Application Priority Data

Dec. 19, 1985 [AU] Australia ............................ PH3944

[51] Int. Cl.⁴ .............................................. G01F 1/76
[52] U.S. Cl. ........................................ 73/216; 73/296
[58] Field of Search ............ 73/215, 216, 296, 861.02, 73/861.03, 861, 861.01; 340/606; 374/129, 139, 14

[56] References Cited

U.S. PATENT DOCUMENTS

| | | | |
|---|---|---|---|
| 1,211,794 | 1/1917 | Lossau | 73/216 X |
| 1,215,533 | 2/1917 | Hoppes | 73/296 X |
| 1,258,268 | 3/1918 | Sorge, Jr. | 73/296 X |
| 1,580,678 | 4/1926 | Roucka | 73/216 X |
| 2,018,538 | 10/1935 | Webb | 73/861 |
| 2,831,340 | 4/1958 | Crandall et al. | 374/56 |
| 3,945,532 | 3/1976 | Marks | 73/861.73 X |
| 4,098,116 | 7/1978 | Browne | 73/861 |
| 4,238,956 | 12/1980 | Sniezek et al. | 73/861.01 |
| 4,276,774 | 7/1981 | McGookin | 73/296 X |
| 4,297,893 | 11/1981 | Weinstein | 73/861 |
| 4,533,243 | 8/1985 | Zhukov et al. | 374/139 X |

FOREIGN PATENT DOCUMENTS 136945 12/1919 United Kingdom ................. 73/215

Primary Examiner—Herbert Goldstein
Attorney, Agent, or Firm—Rodman & Rodman

[57] ABSTRACT

A device for determining flow rate of a liquid material that is discharged from an orifice. There is provided a container having a container wall extending upwardly to an open mouth for collection of the discharge from an orifice. The container has a discharge opening in its base and is supported by suspension means from a load cell. The signal from the load cell, which is responsive to the downward force imparted by the container and liquid material therein, is transmitted to a readout means. Since the liquid material flows at a determined rate from the discharge opening the signal from the load cell is directly related to the flow rate of the liquid material, thereby enabling the flow rate to be calculated.

7 Claims, 1 Drawing Sheet

FLOW RATE DETERMINATION

This invention relates to a means and a method for determining a flow rate of discharge of liquid material flowing through a discharge orifice. Although the invention is not intended to be limited to a device for use for determining the flow rate of a melt from a furnace, the invention is particularly suited for such use.

BACKGROUND OF THE INVENTION

In the control of certain industrial processes, it is desirable that the flow rate of melt should be readily determinable, and for example it is desirable that the discharge of melt of metal slag, mineral product, or the like from a furnace orifice should be readily determinable. Various attempts have been made heretofore to have a flow rate device capable of measuring the rate of flow of discharge of flowable materials, and reference can be made to the U.S. Pat. No. 4,513,830 in the name of PERSBECK and ALMQUIST but the device described in that specification related to a continuous flow of material into a container but intermittent by emptying of the container, and determining flow rate by the rate at which the container refilled. The only other prior art known to the Applicant is U.S. Pat. No. 3,942,562, ICI, relating to controlling flow rate of fine powders; U.S. Pat. No. 3,945,532 TRANSMATIC FYLLAN which detects a dynamic force imparted by flowable material on a metering element, U.S. Pat. No. 3,939,709 Consolidation Coal wherein particulate material impinges on an impact member; and PCT application No. 85/01577 GEBRUDER BUHLER, which intermittently weighs particulate material flowing through a weighing pipe.

BRIEF SUMMARY OF THE INVENTION

The main object of this invention is to provide a continuous flow rate measuring means and method, and in one embodiment of the invention there is provided a container having a container wall extending upwardly to an open mouth, and a discharge opening in its base. The container is supported by suspension means from a load cell, and a signal from the load cell is transmitted to readout means, the signal being responsive to the downward force imparted by the container to the load cell.

The invention is particularly suitable for determining the weight of a material wherein the flow is a function of viscosity and head. For liquids whose flow can be approximated by a Newtonian liquid, the flow rate through an orifice of any one size is proportional to the square root of the head above the orifice according to the equation $Q = kA\sqrt{h}$ where "k" is a constant, "A" is the area of cross-section of the outlet orifice and "h" is the head above the orifice. Adjustments need to be made to compensate for the dynamic effects of liquid flowing into the container, for varying viscosities which in the case of a furnace melt will vary with temperature, and for other elements which may vary in specific instances (spatter and the like) but the invention is so simple that calibration is easy, and once an accurate flow rate has been ascertained for a certain melt at a certain temperature, accuracy in the range of ± ten percent is quite practicable. Such accuracy is useful for process control purposes.

BRIEF SUMMARY OF THE DRAWING

An embodiment of the invention is described hereunder in some detail with reference to and is illustrated in the accompanying schematic drawing, wherein.

DETAILED DESCRIPTION OF THE PREFERRED EMBODIMENT

Figure 1:
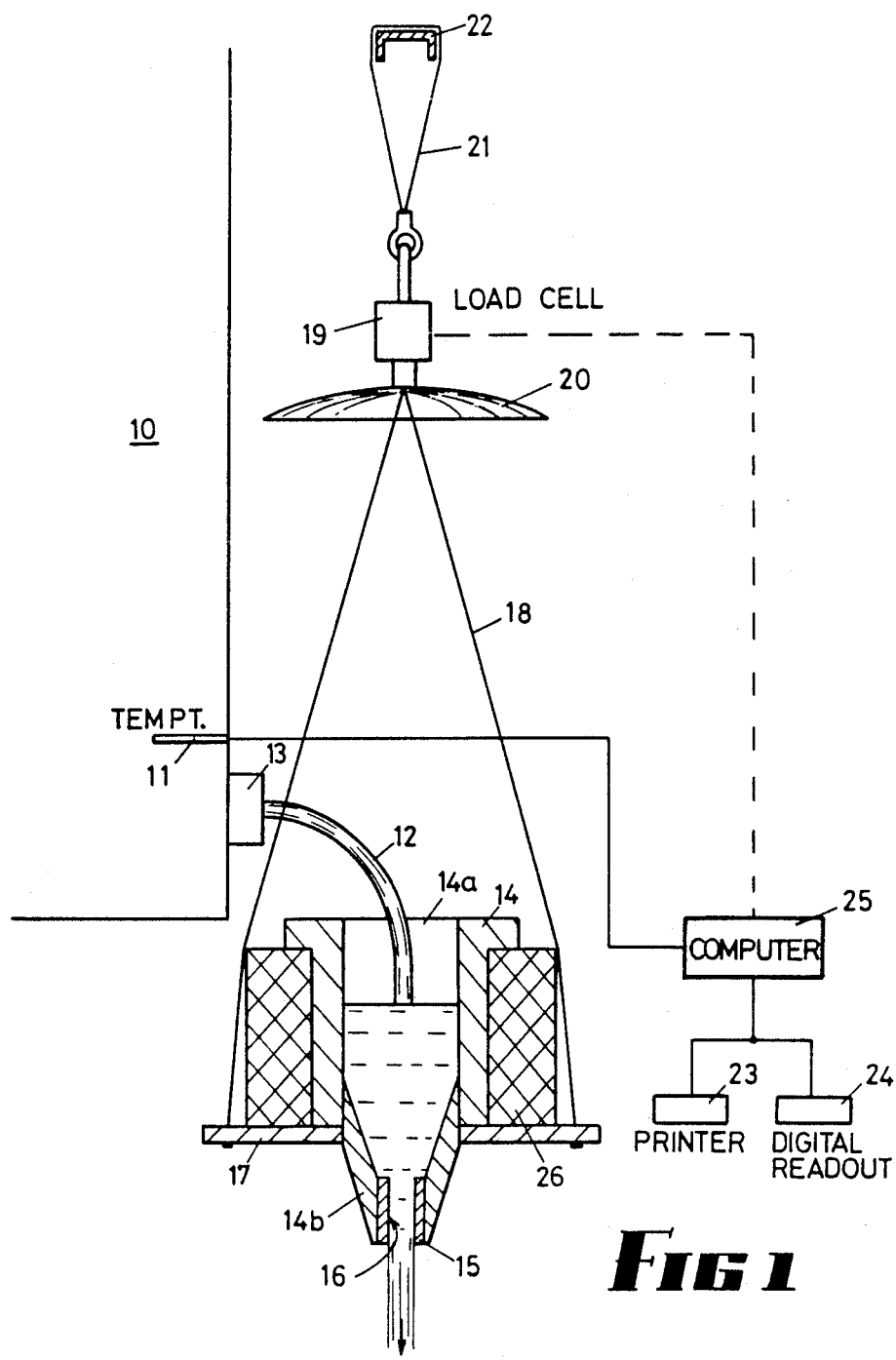
FIG. 1 is a cross-section through a container positioned to receive a melt discharged from a furnace through an orifice, the container being suspended from a load cell.

In this embodiment, a furnace 10 is arranged to melt slag or rock at a temperature which is normally between 1400° C. and 1600° C. Although the furnace is shown with a temperature probe 11, in some instances the temperature signal will be determined by optical means (for example an optical sensor responsive to the colour of a stream of melt 12 which flows from an orifice (not shown) in discharge sleeve 13).

The melt discharge 12 is directed into an open topped container 14, the side wall 14a of which extends upwardly to an open mouth, and the base 14b of which comprises a sleeve 15 of high melting point and wear resistant material through which the melt within the container passes. Carbon is one material which is useful for resisting wear occasioned by the flow of molten slag or rock. The outflow through the discharge aperture 16 of sleeve 15 is proportional to the square root of the head of melt in the container 14, above the aperture 16, and therefore the head of the melt, being proportional to weight, gives an accurate means of determining flow rate provided cross-sectional area of aperture 16, and (an experimentally determined) flow coefficient are known. The flow coefficient is a function of the temperature, and therefore the temperature can be transmitted to a computer 25 from the temperature sensing means 11, for use as a determinant of the flow coefficient at that temperature.

The container 14 is carried on a plate 17 which is suspended by cables 18 from a load cell 19. A heat shield 20 protects the load cell 19 from excessive temperature rise which might otherwise interfere with the load cell accuracy. The load cell itself is suspended by a cable 21 from an overhead beam 22. The signal from the load cell is also fed into the computer 25, and with the knowledge of weight derived from the load cell, the head of liquid within the container 14 can be readily ascertained, and with a knowledge of temperature a signal responsive to which is transmitted to the computer from the temperature sensor, the flow coefficient for the particular material in the flow 12 can be ascertained and in turn the flow rate through the opening 15 can also be determined.

The computer 25 is programmed to both print out on a printer 23 and to show on a digital read-out panel 24. The computer, its programming, the printer 23, and the digital read-out panel 24 are all in accordance with prior art and do not form part of this invention.

The continuously measured flow rate can be used by itself as process information for use by the operator, for production records, or as the input to a feedback system for controlling the flow rate.

There are of course variations which must be compensated for in the calibration of the printer and readout, including the dynamic forces due to impact of the stream of melt encountering the comparatively slow moving melt within the container 14, such small changes as might exist by way of spatter or freezing of the melt in the top part of the container, and variables due to variations in the mixture contained in the furnace 10, but these are readily determined by empirical means. The existence of an insulating sleeve 26 surrounding the container 14 assists in reducing the temperature variation and therefore assists in maintaining a relatively high degree of accuracy.

I claim:

1. Means for determining flow rate of liquid melt discharge through an orifice through a discharge sleeve in the side wall of a furnace, comprising a container having a side wall extending upwardly from a base to an open mouth, a wall defining a discharge aperture in the base, a load cell, suspension means above the load cell and to one side of the furnace including means for suspending the container from the load cell at a locality where the container mouth is in the path of flow of said liquid when discharged from the orifice, and signal readout means coupled to the load cell and responsive to the downward force imparted by the container and its contents to the load cell, the relative locations and sizes of the orifice, load cell, suspension means, container, and discharge aperture being such that melt discharging from the furnace and through the orifice enters, and partly fills, the container, the head of liquid in the container causing continuous flow of liquid outwardly from said discharge aperture.

2. Means according to claim 1 further comprising an insulating sleeve surrounding the container.

3. Means according to claim 1 further comprising a heat shield also suspended by said suspension means below the load cell but above the orifice.

4. Means according to claim 1 wherein the suspension means comprises a suspension member suspending the load cell.

5. Means according to claim 1 further comprising a temperature responsive sensor, a computer, a printer and a digital readout device, and conductors interconnecting said load cell, computer, printer, digital readout device and temperature sensor, the computer being programmed to at least partly compensate for temperature variation.

6. Means according to claim 5 wherein said temperature sensor is a thermostat which extends through the wall of the furnace.

7. Means according to claim 5 wherein said temperature sensor is an optical device responsive to colour and temperature of said liquid discharge.

* * * * *